Patented Feb. 14, 1933                                      1,897,424

UNITED STATES PATENT OFFICE

JOHN P. FOSTER, OF PAIA, TERRITORY OF HAWAII

PROCESS OF PURIFYING SUGAR JUICES

No Drawing.          Application filed December 23, 1930. Serial No. 504,411.

This invention relates to processes of purifying sugar juices and it comprises a process wherein raw juice, such as that obtained from sugar cane or beets, is treated with an acid to increase the hydrogen concentration of the juice to a point at which non-sugars are thrown out of the solution and the mixture of juice and insoluble non-sugars then subjected to centrifugal separation; it further comprises a process wherein the raw sugar juices are treated with an acid, the resulting mixture of non-sugars centrifuged as above, and the clear liquor coming from the centrifuge further freed of remaining non-sugars by liming the juice and separating the insoluble non-sugars without the application of heat thereto.

The purification of raw sugar juices in order to fit them for the maximum crystallization of their sugar content, has long been a complex problem and most if not all of the methods proposed have been largely of an empirical nature. Raw sugar juice is a complex, slightly acid, aqueous solution of sugars, both crystallizable and non-crystallizable, together with organic and inorganic impurities collectively known as non-sugars. These non-sugars are complex albuminous materials, proteins, bits of cellulosic materials, iron compounds, etc. It is practically impossible to obtain any significant crystallization by boiling down raw sugar juice because the non-sugars present inhibit crystallization. The aim of the sugar industry has been to remove all of the non-sugars without destroying or otherwise losing any of the available sugars. If it were possible to remove all of the non-sugars without loss of the sugar in the solution, a great deal more sugar could be obtained from a ton of sugar cane or from a ton of juice extracted therefrom.

Generally speaking, prior workers have found it necessary to lime the juices to a high alkalinity in order to form insoluble lime compounds of the non-sugars. But the precipitate of insoluble substances, or "scums" obtained in this manner is difficult to filter in the cold. Heat has been resorted to to coagulate the precipitate. This, however, tends to return the non-sugars to the solution because their calcium compounds decompose to some extent when heated. Furthermore, the problem is complicated by the fact that lime itself forms insoluble compounds, such as calcium sucrose, with the very sugar it is desired to obtain and this of course constitutes a loss of available sugar.

When glucose is present in the juice, calcium compounds thereof may also be formed, especially if the alkalinity exceeds pH 9.5 to 10. Calcium-glucose compounds when heated to 55° C. or higher decompose rapidly giving viscous and dark colored decomposition products which, if present in large quantities, make the manufacture of raw sugar difficult.

So, in order to avoid the foregoing disadvantages in heating a highly limed juice, say one limed to pH 14 it is customary to carbonate the limed juices until the alkalinity has been reduced, even to almost neutrality and in this way obtain a precipitate of calcium carbonate which carries down with it some of the non-sugars. Without resorting to carbonation it is practically impossible to filter a cold highly limed juice. But carbonation presents disadvantages because some non-sugars are thrown out of solution only at high alkalinity, say pH 10 to 14 and carbonation since it acts to decrease the pH, tends to return these non-sugars to the solution. At best, prior practice has been unsatisfactory in many respects.

Cold defecation, that is, purification without resort to heating, is most desirable; it has never been practically realized because the insoluble lime compounds either cannot be filtered at all or cannot be filtered fast enough from a cold limed juice.

In my copending application, Ser. No. 468,487, July 8, 1930, I have described a process wherein cold defecation is rendered practical and in that process I lime the juices in the cold and then separate the insoluble lime compounds in a centrifuge. This process enables me to avoid heating the juices and to avoid excessive carbonation of the limed juices, and, so far as I am aware, I am the first to have described the use of a centrifuge at this particular point in the process. By it, I am enabled to greatly lessen the cost of purifying raw sugar juices, to greatly speed up the time required for purification, to obtain an increased yield of sugar and to obtain a better quality of sugar.

In the present invention, I systematically control the hydrogen ion concentration of the juices to be purified in such a way that even greater purification of the raw juices is realized. I depart from the process described in the aforesaid copending application and from any prior practice, in that I first treat the raw sugar juices with an acid to increase the hydrogen ion concentration of the juice. I have found that many of the non-sugars are more easily precipitated or rendered insoluble by increasing the hydrogen ion concentration rather than decreasing it, the latter being the method described in the copending application referred to. These compounds, insoluble in acid solution, cannot be filtered in the cold and that is probably one of the reasons why the prior art has not considered any simple acidification process useful. Heating an acid juice to flocculate the insolubles cannot of course be done because sucrose is converted to dextrose and levulose. This is commonly referred to as inversion and it proceeds with great rapidity when an acidified sugar solution is heated.

However, I have further found that the insoluble non-sugars resulting from acidification of the raw sugar juices can be separated in the cold by means of centrifugal separation and when using this method of separation I can separate the non-sugars thrown out of an acidified solution without difficulty and thus avoid heating.

This preliminary acidification treatment coupled with centrifugal separation without heating the juices constitutes the primary feature of the present invention and is to be distinguished from certain prior processes wherein raw sugar juice is treated with sulfurous acid to bleach the juice. In this prior practice, the acidified juice is always limed after the acid treatment and before it is filtered. This is necessary in order to filter the juice because the insoluble substances thrown out of the solution by means of the sulphurous acid cannot be separated therefrom merely by ordinary filtration. The juice acidified with sulfurous acid cannot of course be heated in order to coagulate the precipitate since that would result in an inversion of the sugar which must be avoided. Accordingly, when using sulfurous acid in the purification of sugar juices, prior workers have always found it necessary to lime the acid juices to that point where the juices can be heated, and the precipitate thus flocculated, without inversion of the sugar taking place.

In contrast to this prior art practice, I acidify the juices and then separate the insoluble precipitate from the unheated acidified juices by centrifugal separation. I do not add lime prior to the separation step, and I do not heat.

After obtaining a clear acidified juice which is free of non-sugars rendered insoluble by the addition of acid I can then continue the purification of the juice in various ways.

Advantageously, I decrease the hydrogen ion concentration of the centrifuged acidified juices by adding lime thereto until non-sugars rendered insoluble by an increase in alkalinity are thrown out of the solution. The limed juice can then be centrifuged or filtered without the necessity for heating and the non-sugars thus removed. Or I may lime the juices to high alkalinity, filter, and then carbonate back to such hydrogen ion concentration that, upon separating the precipitate of calcium carbonate, the clear juice is rendered suitable for concentration and crystallization of the sugar therein.

More specifically, I can proceed as follows:—

To a ton of raw sugar juices, either cane or beet, I add sulphurous or sulphur dioxide acid until the juice contains about 0.05 milligrams of free sulphur dioxide per liter. This is roughly equivalent to a pH value of about 3.5. The pH value given is merely illustrative and is not to be taken as an absolute for the reason that sugar juice varies and the amount of acid added must be governed largely by the character of the raw juice. In practice, the sugar house operative will determine the best hydrogen ion concentration for the particular juice he is to purify having regard to the temperature of the juice, its constituents and its natural acidity. Generally speaking the limits are about pH 2.0 to pH 5.0. Within this range, non-sugars rendered insoluble by the presence of a high hydrogen ion concentration are thrown out of most raw sugar juices.

Without heating the juices, I then pass the acidified solution to a centrifuge, advantageously of the well known Kopke type. In the centrifuge, the insoluble non-sugars are separated from the acidified juices. I also am enabled to remove much of the non-sugar material including cellulosic material such as bits of stalk, leaves, etc. These substances, were they not removed at this point, would tend to gelatinize in the subsequent steps. Freeing the juices of cellulosic material prior to any liming operation is one of the important features of this invention since it makes it possible to realize cold defecation as will be more fully described. Wax and ceresin, both of which inhibit the filtration of ordinary cold limed juices are also removed.

The acidified clear juice flowing from the centrifuge is then passed to a tank wherein the juice is mixed with lime. Advantageously, the juice is limed to that point at which remaining sugars are thrown out of solutions. One of the unexpected results in my process is that the acidified juice coming from the centrifuge can, upon being limed, be filtered cold whereas heretofore it has always been necessary to heat the limed juice to 80° C. or more in order that it might be filtered. This new result is largely due to the fact that the solution is free of cellulosic materials and wax, as well as a part of the soluble non-sugars all of which prevent the ordinary filtration of a cold, limed juice.

Alternatively, I can lime the acidified clear juice coming from the centrifuge to a very high degree say an alkalinity of pH 12 to 14, filter in the cold, and then carbonate the juices to lower the hydrogen ion concentration to about neutrality. After separation of the precipitate of calcium carbonate and decolorization, the solution is ready for concentration. It should be noted that in this alternative method, I am filtering a highly limed juice prior to carbonation. This is new in the art.

Various other ways of continuing the purification of the clear, acid juice coming from the centrifugal after the first separation of non-sugars will be apparent to those skilled in the art.

During the acidification step in my process, it is advantageous to have a buffer substance present. This is particularly so when sulfurous acid or sulfur dioxide is used to acidify the juice and in this case I first add a small amount of lime in quantity quite insignificant as regards purification of the juice and then treat the juices with sulfurous acid until the acidity is the best for the separation of the non-sugars rendered insoluble in acid solution. In this case the lime reacts with the sulfur dioxide to form calcium sulfite which has a powerful buffering action and which enables me to acidulate the juices to a greater degree than would otherwise be possible or advisable.

Various other acids such as phosphoric, or carbonic, may be used and I do not wish to be restricted to any particular inorganic acid, generally, weak acids are employed since they do not invert the sucrose rapidly. Very strong mineral acids should be avoided unless buffer substances are present.

As stated, I regard the essential features of my invention to reside in the initial steps of acidifying the juices in the cold and then centrifugally separating the insoluble substances from the juices whereby a preliminarily purified juice is obtained which can be limed and filtered cold, in other words defecated without the application of heat. However, it is to be understood that my invention can be used in conjunction with various processes of purifying sugar and that the subsequent treatment of the acidified clear juice coming from the centrifuge can be carried out in other ways than those specifically described.

What is claimed is:

1. The process of freeing sugar juices from non-sugars therein which includes acidifying an unlimed raw sugar juice, which contains substantially all of the non-sugars of an unpurified raw juice, with sulfur dioxide to increase the hydrogen ion concentration thereof and to render non-sugars insoluble and then centrifugally separatig the insoluble non-sugars from the unheated acidified juice.

2. The process of freeing sugar juices from non-sugars therein which includes acidifying an unlimed raw sugar juice, which contains substantially all of the non-sugars of an unpurified raw juice, with sulfur dioxide until the juice contains about 0.05 milligrams of free sulfur dioxide per liter to increase the hydrogen ion concentration thereof and to render non-sugars insoluble and then centrifugally separatig the insoluble non-sugars from the unheated acidified juice.

3. The process of freeing sugar juices from non-sugars therein which includes acidifying an unlimed raw sugar juice, which contains substantially all of the non-sugars of an unpurified raw juice, with sulfur dioxide to increase the hydrogen ion concentration thereof and to render non-sugars insoluble, centrifugally separating the insoluble non-sugars from the unheated acidified juice and then decreasing the hydrogen ion concentration of the juice to render remaining non-sugars insoluble.

4. The process of freeing sugar juices from non-sugars therein which includes acidifying an unlimed raw sugar juice, which contains substantially all of the non-sugars of an unpurified raw juice, with sulfur dioxide until the juice contains about 0.05 milligrams of free sulfur dioxide per liter to increase the hydrogen ion concentration thereof and to render non-sugars insoluble, centrifugally separating the insoluble non-sugars from the unheated acidified juice and then decreasing the hydrogen ion concentration of the juice to render remaining non-sugars insoluble.

5. The process of freeing sugar juices from non-sugars therein which includes acidifying an unlimed raw sugar juice, which contains substantially all of the non-sugars of an unpurified raw juice, with sulfur dioxide to increase the hydrogen ion concentration thereof and to render non-sugars insoluble, centrifugally separating the insoluble non-sugars from the unheated acidified juice and then liming the juices to render remaining non-sugars insoluble.

6. The process of freeing sugar juices from non-sugars therein which includes acidifying an unlimed raw sugar juice which contains substantially all of the non-sugars of an unpurified raw juice, with sulfur dioxide until the juice contains about 0.05 milligrams of free sulfur dioxide per liter to increase the hydrogen ion concentration thereof and to render non-sugars insoluble, centrifugally separating the insoluble non-sugars from the unheated acidified juice and then liming the juices to render remaining non-sugars insoluble.

In testimony whereof I affix my signature.

JOHN P. FOSTER.